United States Patent
Patchen et al.

(10) Patent No.: US 7,210,051 B2
(45) Date of Patent: Apr. 24, 2007

(54) SYSTEM AND METHOD FOR HANDLING STATE CHANGE CONDITIONS BY A PROGRAM STATUS REGISTER

(75) Inventors: Paul J. Patchen, Arlington, TX (US); William V. Miller, Arlington, TX (US)

(73) Assignee: VIA Technologies, Inc. of Taiwan, Taipei (TW)

( * ) Notice: Subject to any disclaimer, the term of this patent is extended or adjusted under 35 U.S.C. 154(b) by 290 days.

(21) Appl. No.: 10/703,279

(22) Filed: Nov. 7, 2003

(65) Prior Publication Data
US 2005/0102546 A1   May 12, 2005

(51) Int. Cl.
*G06F 1/04* (2006.01)
(52) U.S. Cl. .......................... 713/500; 713/228; 714/15
(58) Field of Classification Search ................. 713/500; 712/228; 714/15
See application file for complete search history.

(56) References Cited

U.S. PATENT DOCUMENTS 5,682,492 A * 10/1997 McFarland et al. ......... 712/214
5,701,493 A * 12/1997 Jaggar ........................ 710/261
5,758,112 A * 5/1998 Yeager et al. ............... 712/217

OTHER PUBLICATIONS

Frazier, Tiffany et al., Execution-Driven Simulation of Error Recovery Techniqes for Multicomputers, Apr. 7-9, 1997, Simulation Symposium, pp. 4-13.*

* cited by examiner

*Primary Examiner*—Dennis M. Butler
*Assistant Examiner*—Mark Connolly
(74) *Attorney, Agent, or Firm*—Preston Gates & Ellis LLP (57) ABSTRACT

An improved program status register is disclosed with a feature to handle state change for a processor and its memory subsystem. The program status register comprises a clock, at least one update value for updating the program status register to a second value from a first value when an update enable signal is received, a sampled program status register storing the first value of the program status register, and a state change sampling register generating a synchronized state change signal from a state change indication signal and the clock. When the update enable signal is initially received and a state change indication signal is further received thereafter during a first clock cycle, an updated output of the program status register is restored through a first selection module triggered by the synchronized state change signal to the first value in a second clock cycle following the first clock cycle.

18 Claims, 7 Drawing Sheets

SYSTEM AND METHOD FOR HANDLING STATE CHANGE CONDITIONS BY A PROGRAM STATUS REGISTER

BACKGROUND

The present disclosure relates generally to integrated circuit (IC) design, and more particularly to an improved design for handling data abort conditions.

In a processor system, data and instruction values are read to and written from a memory subsystem. The memory subsystem may issue an abort instruction to the processor upon the occurrence of a memory access rule violation or other access rule violation. When an abort condition occurs, the processor must properly flush any instructions that might have been pipelined following the aborted instruction.

In addition, the memory subsystem negates any controls that would change processor status registers. Typically, a data abort recovery process is performed to detect the abort condition in the memory access clock cycle. Usually, the logic intercepts the status register update controls. When the current memory access instruction is aborted and a state changing instruction is the next pipelined instruction, the interception of the status register update controls ensures that the prior register state can be maintained. It is, however, disadvantageous to add additional circuit component or logic in the abort condition sampling path. Even if additional logic is allowed to be implemented, since the memory subsystem requires certain time to determine an abort condition, it is desired, from the perspective of system timing, for the processor to sample an abort condition indicator as late as possible in a memory access clock cycle so as to avoid creating critical timing paths in the processor and memory subsystem.

What is needed is an improved method and system for maintaining the proper register status state while validating the abort condition as late as feasible in the memory access clock cycle.

SUMMARY

As disclosed herein, an improved program status register handles state change functions well for a processor and its memory subsystem. The program status register comprises a clock, at least one update value for updating the program status register to a second value from a first value when an update enable signal is received, a sampled program status register storing the first value of the program status register, and a state change sampling register generating a synchronized state change signal from a state change indication signal and the clock. When the update enable signal is initially received and a state change indication signal is further received thereafter during a first clock cycle, an updated output of the program status register is restored through a first selection module triggered by the synchronized state change signal to the first value in a second clock cycle following the first clock cycle.

These and other aspects and advantages will become apparent from the following detailed description, taken in conjunction with the accompanying drawings, illustrating by way of example the principles of the disclosure.

DESCRIPTION

An improved processor design is disclosed for handling processor state recovery, especially for restoring a prior register state of a program status register under an abort condition. Since the abort operation is the most commonly occurring state interruption/change process, the present disclosure illustrates various examples in the context of an abort operation.

Figure 1A:
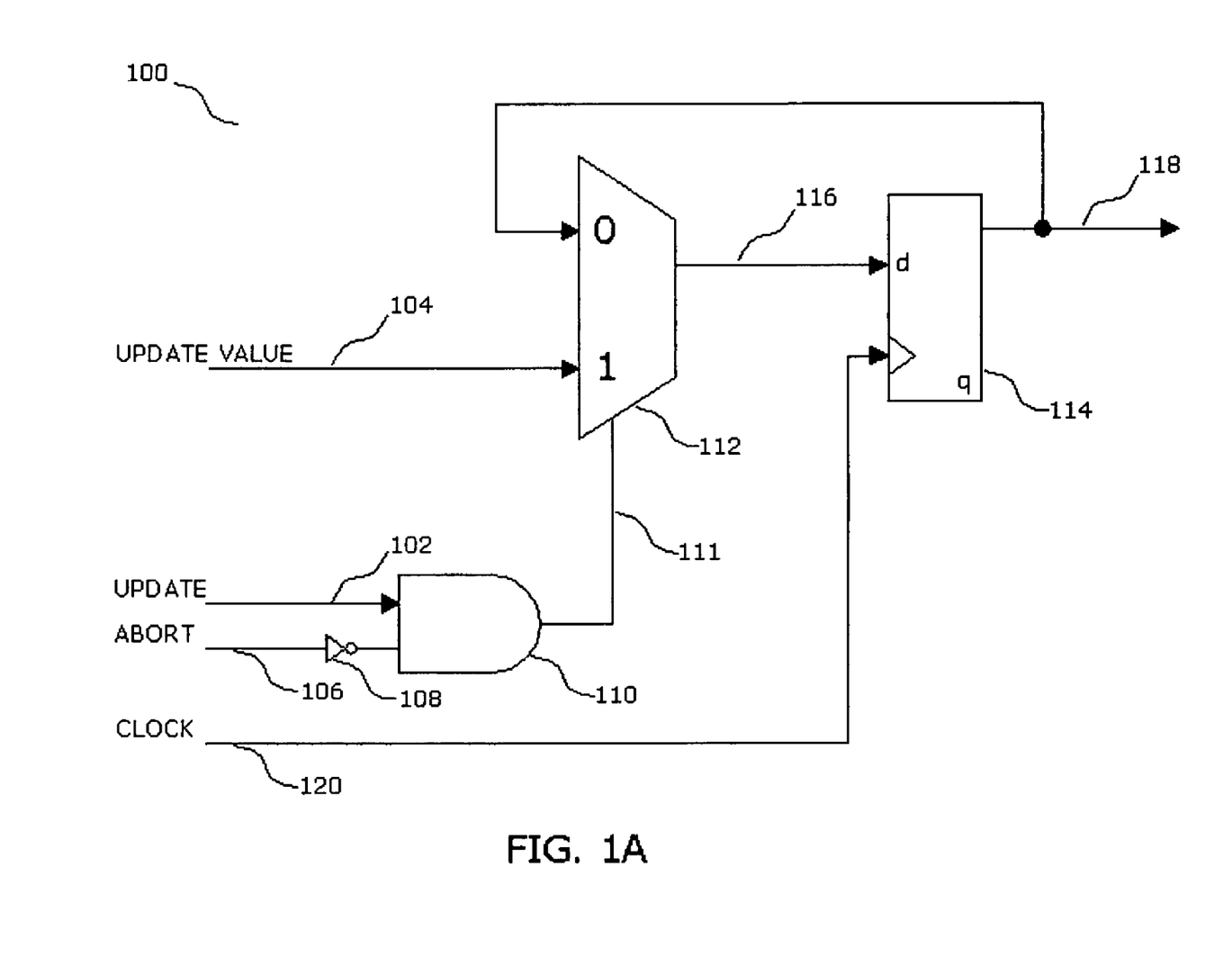
FIG. 1A illustrates a logic diagram of a typical program status register for handling a data abort condition.

FIG. 1A illustrates a part of circuit logic 100 of a processor around a typical program status register. The program status register may have multiple bits, and what is shown is only for one bit as the circuit logic for each bit is identical.

As it is shown, when no abort condition can be detected, the processor may set a control signal UPDATE (102) to "1" (assuming in this example "1"=TRUE, "0"=FALSE). As shown, another signal, UPDATE VALUE (104), should be written into the register on the next clock edge. However, when a data abort signal is received, the processor sets a control signal ABORT (106) to "1". Since a two-input AND gate (110) receive the UPDATE (102) and the ABORT (106) through an inverter (108), when the ABORT is "0", the two-input AND gate generates an output "1" feeding as an input control (111) into a multiplexor (112). When the input control is "1", the multiplexor (112) selects the UPDATE VALUE (104) and makes it available to a flip-flop (114) as its input (116). The output of the flip-flop (118) is the output bit value for the program status register. As such, when a CLOCK signal (120) feeds into the flip-flop (114), the program status register is thus updated by the UPDATE VALUE. The output of the flip-flop (114) also feeds back to the multiplexor (112) to preserve the value of the program status register for an additional clock cycle. This feedback signal may be referred to as a prior register state.

When an abort condition is detected, the ABORT (106) is TRUE, a "0" is generated by the inverter (108), and the output (111) of the AND gate (110) becomes "0". Upon receiving the "0" as its input control, the multiplexor (112) selects the prior register state instead of the UPDATE VALUE (104), and pushes it to the flip-flop (114). As usual, the flip-flop (114) holds the selected value until the CLOCK signal (120) is received.

The ABORT signal path, in this example containing an inverter (108) and a two-input AND gate (110), requires certain time to generate the output (111). This forces the memory subsystem to be designed to generate the ABORT signal (106) early enough in the clock cycle or to extend the clock cycle of the processor to allow time for propagating the signals.

Figure 1B:
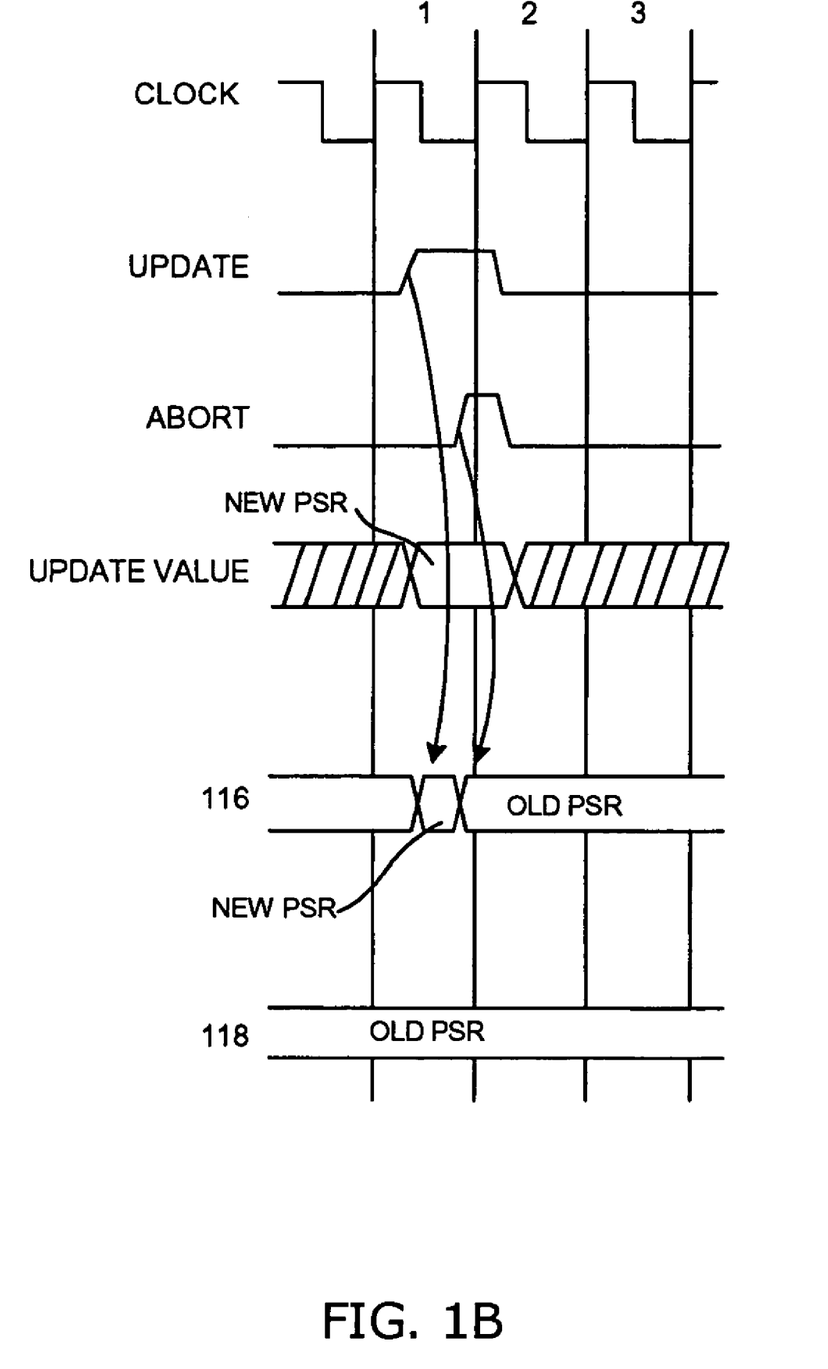
FIG. 1B is a timing diagram of the program status register of FIG. 1A.

FIG. 1B illustrates a timing diagram showing signal changes according to the design of FIG. 1A. As shown, the UPDATE signal 102 of FIG. 1A rises before the ABORT signal 106 is triggered, which is preferred to come in as late as possible so that the memory subsystem can have more free time to act on some internal events. The UPDATE signal 102 drives the new UPDATE VALUE 104 into the input port of the flip-flop 114 of the program status register as soon as it detects the rise of the UPDATE signal 102. However, when the ABORT signal 106 is triggered before the end of the same clock cycle, the input of each program status register (e.g., the d input of the flip-flop) must be changed to the prior value from the new UPDATE VALUE 104. The flip-flop 114 of FIG. 1A must also have a minimum set-up time before the next clock edge so that the output of the program status register (e.g., the q output) can have the correct value of the prior register state. Therefore, from the time the ABORT signal 106 is changed to the end of the same clock cycle, there must be enough time left to restore the previous program status register value. Also shown in the timing diagram are two signals for node 116 and 118. As shown, the signal for node 118 is restored to the old PSR value even if the signal for node 116 has been changed to a new PSR value during the clock cycle in which an abort has happened.

The current disclosure presents an improved logic that might be included within the processor design. This logic would allow the prior state of the program status register to be held intact while a new value is being written. If an abort condition were detected, the logic would then provide the program status register with the prior state if needed. This improvement would allow the memory subsystem or any other interrupt issuing module of the processor to send a state change signal, such as an abort signal, as late as possible towards the end of the clock cycle.

Figure 2:
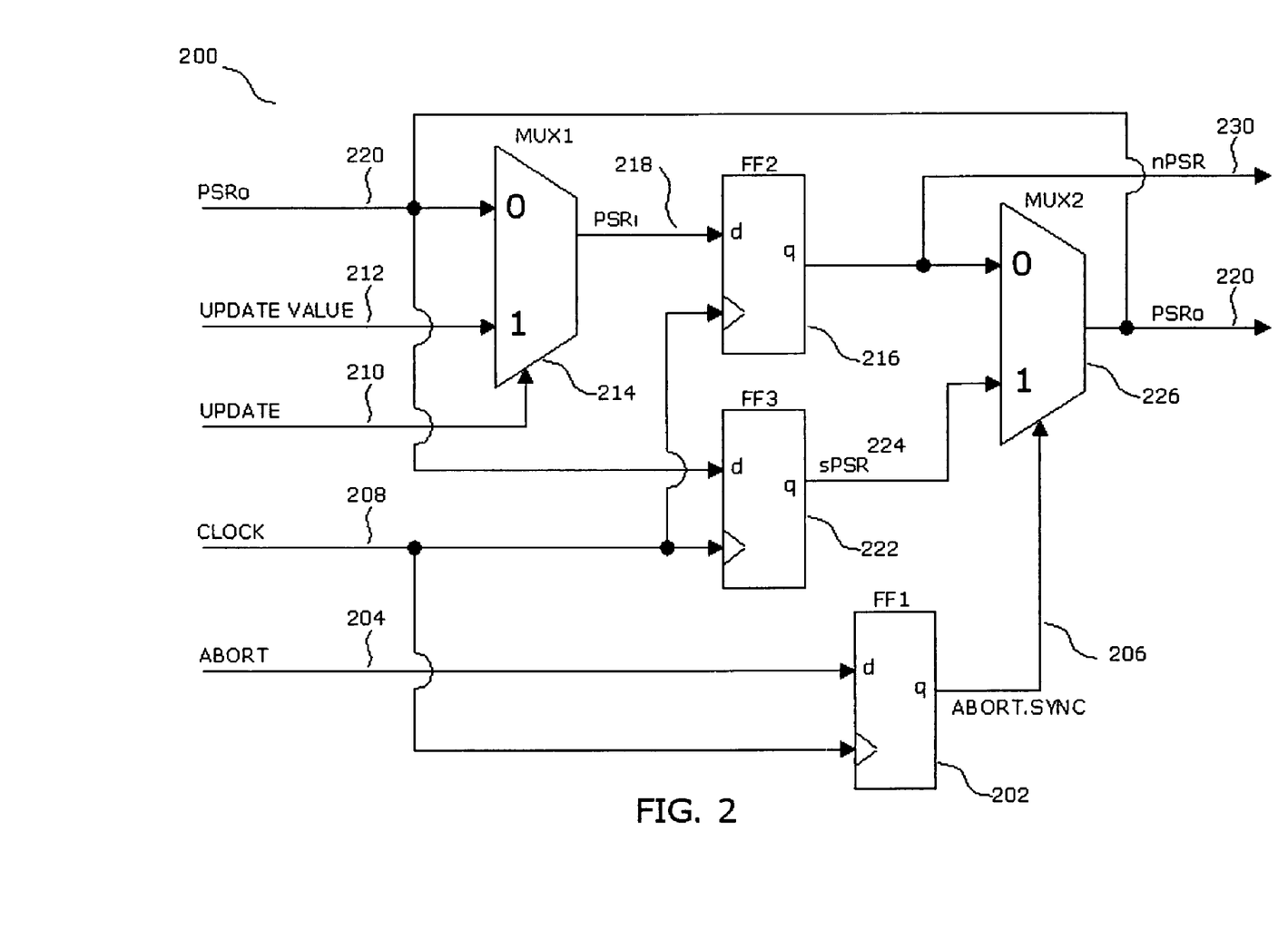
FIG. 2 illustrates a logic diagram of an improved program status register according to one example of the present disclosure.

FIG. 2 illustrates a part of an improved program status register with data abort recovery logic (200) according to one example of the present disclosure. In this example, the processor is able to sample the abort condition towards the end of the clock cycle. Additionally, improved logic is provided to save the prior status register state so that the prior register state can be quickly restored.

As shown, a state change sampling register such as a flip-flop "FF1" (202) is used to sample the ABORT signal (204). FF1 (202) has an output that could be referred to as ABORT.SYNC (206). ABORT.SYNC (206) is synchronized with the CLOCK (208) edge, and will stay high, for example, for the duration of one clock cycle. At the beginning of a typical memory-access cycle, the processor may set an UPDATE control (210) to "1", which indicates that the UPDATE VALUE (212) should be written into a program status register on the next clock edge. A multiplexor "MUX1" (214) selects the UPDATE VALUE (212) and provides it to a synchronizing module such as a flip-flop "FF2" (216). This value will be referred to as the "Program Status Register Input" (PSRi) (218). The current "Program Status Register" value (PSRo) (220) feeds to "MUX1" (214) and is also provided to a flip-flop "FF3" (222) and will be stored as the "Sampled Program Status Register" value (sPSR) (224). Storing the sPSR (224) allows the processor to restore the register to its prior value in the event of an abort operation. On the next clock edge, both the PSR1 through FF2 (or the "Non-bypassed Program Status Register" value (nPSR) (230)) and the sPSR (224) are inputted into another multiplexor "MUX2" (226). MUX2 (226) creates the next "Program Status Register Output" (PSRo) (220) by selecting either nPSR (230) or sPSR (224) and provides it to the memory system (not shown). As PSRo is the valid PSR state on each rising clock edge, the processor logic can view PSRo as the register value for each clock cycle. On the other hand, as the output of FF2, nPSR (230) may not be valid for one clock cycle, but can be used for processor logic that ignores the PSR state after the abort condition has occurred. Since nPSR (230) does not have to go through MUX2, it is a "faster" output that is ready before PSRo (220).

As mentioned previously, if the ABORT signal 204 is received, FF1 (202) is used to sample the ABORT signal (204) to generate the output of FF1 (202), ABORT.SYNC (206). If the ABORT and UPDATE signals are identified as TRUE in the same clock cycle, FF2 (216) will provide the UPDATE VALUE (212) to PSRo (220), but FF1 (202) will signal MUX2 (226) to select sPSR (224) to restore the status register to its prior register state. In addition, as can be seen by comparing the design in FIG. 1 and FIG. 2, the improved design does not require the UPDATE signal to go through a time delaying AND gate.

Figure 3:
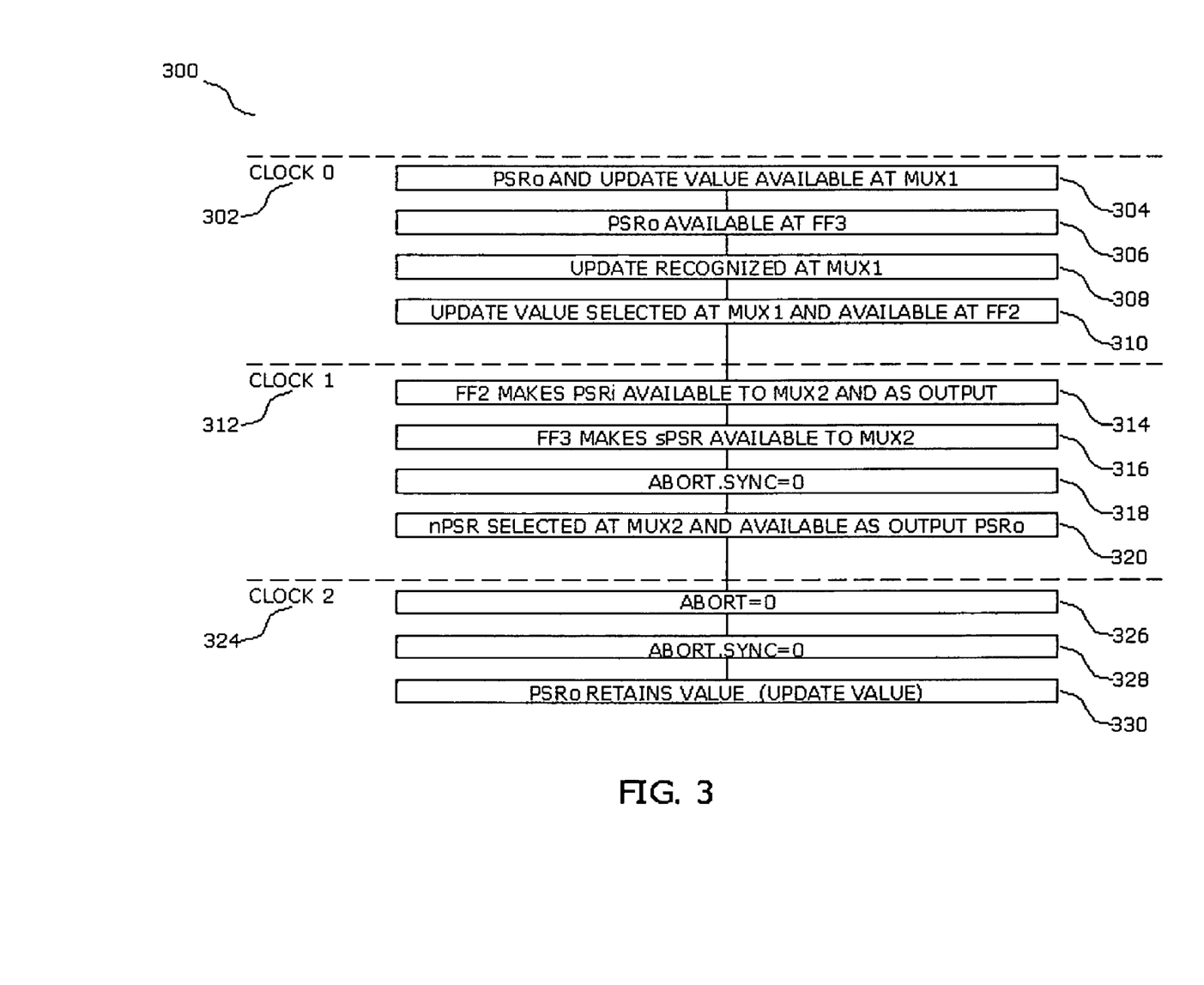
FIG. 3 illustrates a flow chart illustrating the operation of the improved program status register under non-abort conditions.

FIG. 3 illustrates a process flow (300) of the improved data abort recovery system under regular conditions with no abort operation. As the changes are happening with respect to different clock cycles, the process flow (300) is also separated in different sections indicating different clock cycles they are in. It is also understood that although arrows are shown to complete the flow chart, they do not necessarily represent a sequence in time. Operations described in these steps can happen at the same time.

It is further assumed that the process flow begins at any particular clock cycle, for illustration purposes, such as a first clock cycle "CLOCK0" (302). From the beginning of CLOCK0, it is assumed that PSRo and UPDATE VALUE are made available to at MUX1 (step 304). Additionally, at the same time, PSRo is also available at the input of FF3 (step 306). Since the presence of a "TRUE" UPDATE signal is recognized at MUX1 (step 308), the UPDATE VALUE is selected at MUX1 and made available at the input of FF2 (step 310). At this point, the UPDATE VALUE may referred to as PRSi.

Upon the occurrence of the next clock cycle "CLOCK1" (step 312), FF2 makes PSRi available to MUX2, and as an output nPSR (step 314). On the same clock edge, FF3 passes PSRo through and makes sPSR available to MUX2 (step 316). At this time, both the stored or old value, sPSR, and the new UPDATE VALUE are available as inputs to MUX2. Since ABORT.SYNC has not been updated for an abort condition, ABORT.SYNC is 0 (step 318), and MUX2 selects nPSR and makes it available as the output PSRo (step 320). PSRo and nPSR are the same value in this case and are both available as status register outputs. When "CLOCK2" starts (step 324), if there is no abort condition, ABORT=0 (step 326), ABORT.SYNC=0 (step 328), and PSRo retains its value (step 330).

Figure 4:
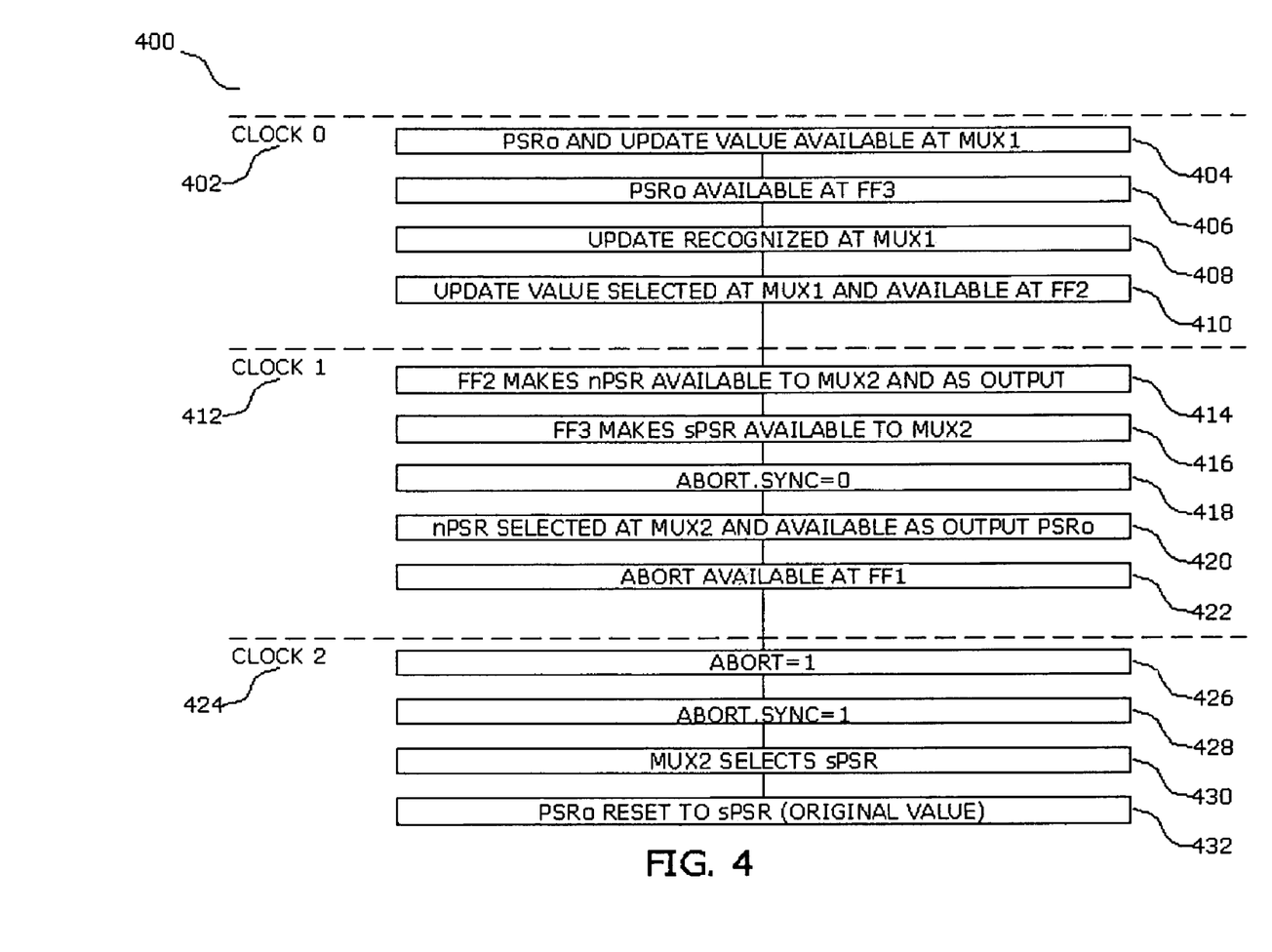
FIG. 4 illustrates a flow chart illustrating the operation of the improved program status register under an abort condition.

FIG. 4 illustrates a process flow (400) according to the operation of the improved data abort recovery system of FIG. 2 under abort conditions. Again, the flow starts at CLOCK0 (402). As in the non-abort scenario, PSRo and UPDATE VALUE are available, and stored in FF2 and FF3 (steps 404, 406, 408, and 410). When CLOCK1 starts (412), FF2 and FF3 make nPSR and sPSR available to MUX2 (steps 414 and 416). Initially, as in the non-abort scenario, ABORT has not yet been sampled, ABORT.SYNC=0 (step 418). nPSR is selected and available as output PSRo (420).

At this time, the process flow (400) is identical to the non-abort process flow. PSRo and nPSR are both available as outputs.

Just before CLOCK2 starts (424), ABORT may appear at FF1 (422). After CLOCK2 (424) starts, ABORT is recognized as TRUE (step 426), and ABORT.SYNC is set to "1" (step 428). This causes the MUX2 to select sPSR (step 430). PSRo is reset to sPSR (the old value) (step 432).

Figure 5:
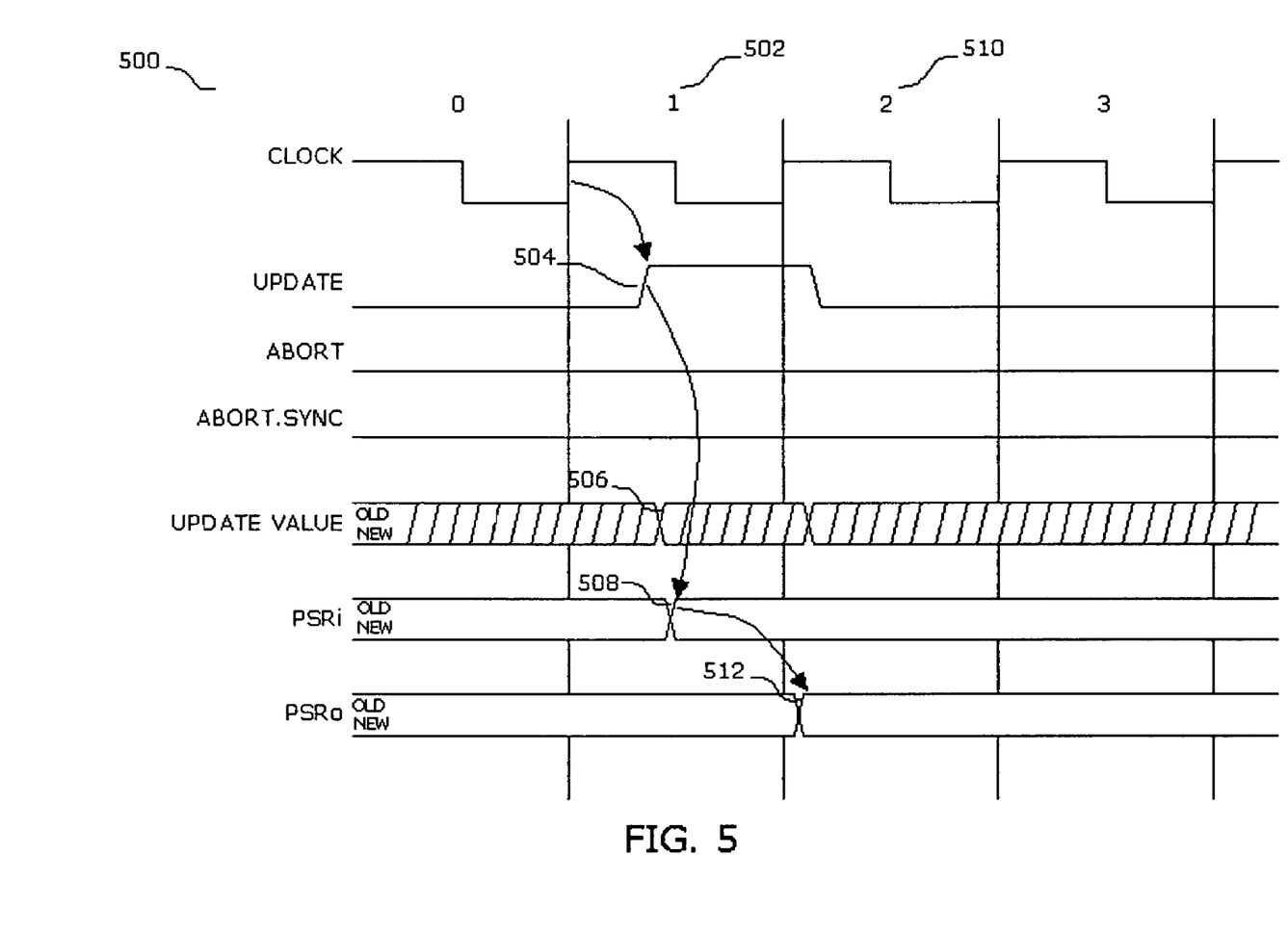
FIG. 5 is a simulated timing diagram illustrating data state changes resulting from the operation of the improved program status register under non-abort conditions.
Figure 6:
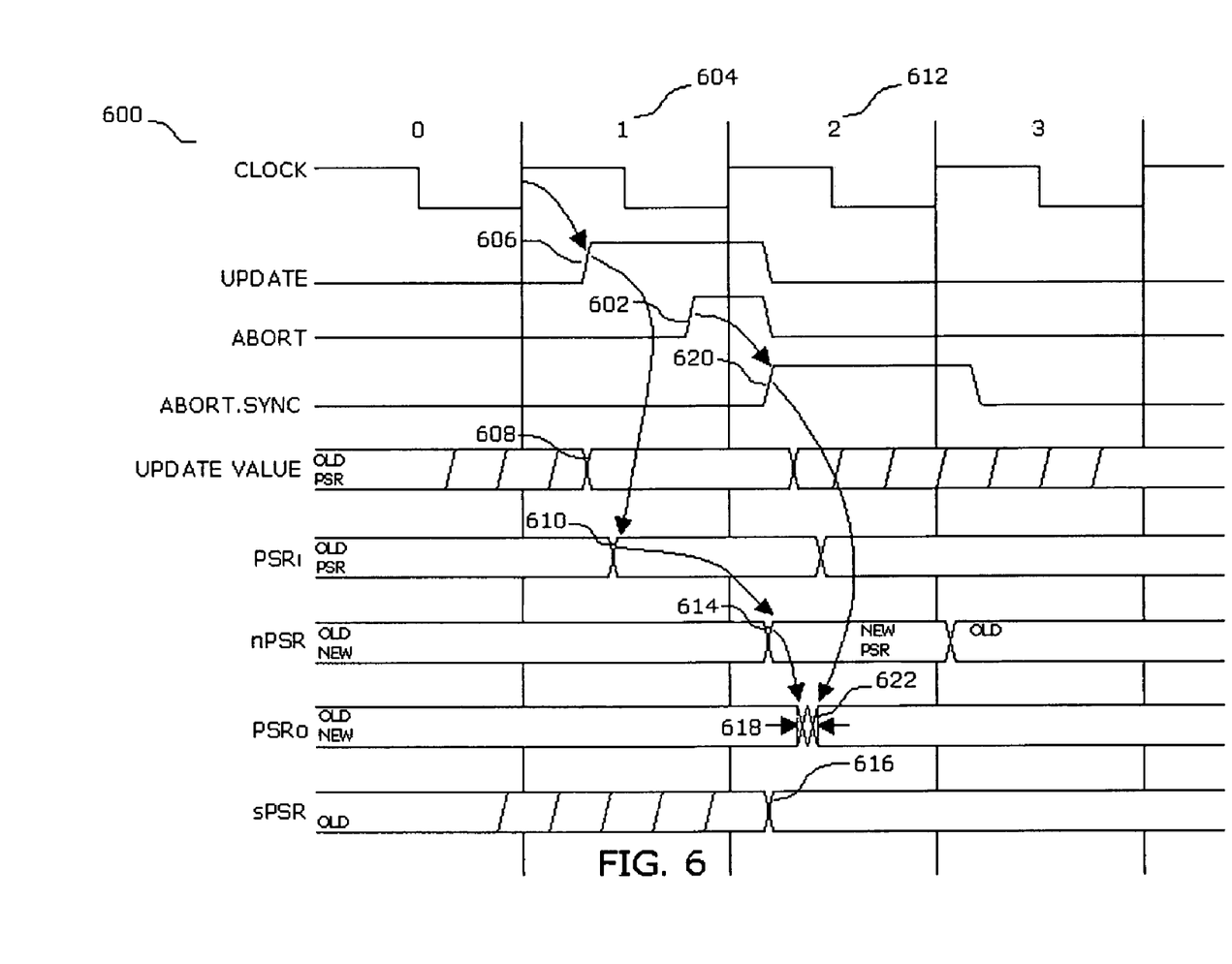
FIG. 6 is a simulated timing diagram illustrating data state changes resulting from the operation of the improved program status register under an abort condition.

FIG. 5 and FIG. 6 illustrate simulated timing diagrams of the above described operations of the improved processor design with data abort recovery features. FIG. 5 illustrates the timing simulation (500) for normal operation without any abort situation. As shown, during CLOCK1 (502), an UPDATE signal is first set to TRUE (504). When the UPDATE VALUE is set to a new value (506), PSRi is set to the new UPDATE VALUE (508) immediately. At the beginning of CLOCK2 (510), PSRo is set to the new UPDATE VALUE (512).

FIG. 6 illustrates the timing simulation (600) with an abort condition (602) occurring in the same clock cycle "CLOCK1" (604) as an UPDATE signal (606). As with the non-abort condition, the UPDATE signal is first set to TRUE (606). Then, the ABORT signal appears (602). The ABORT signal does not impact MUX1 which drives the program status register input. The ABORT signal only needs to meet a small setup time of the flip-flop (FF1) to generate ABORT.SYNC. On the other hand, as the UPDATE VALUE is set to a new value (608), and PSRi is set to the new UPDATE VALUE (610) as usual in CLOCK1. At the beginning of CLOCK2 (612), nPSR with the new UPDATE VALUE becomes available (614).

As PSRo is fed back as the input to FF3, when CLOCK2 starts, sPSR is immediately set to the then PSR value (616), which is the "old value". Before ABORT.SYNC is set to 1, because the change of nPSR, PRSo may initially switched to the new UPDATE VALUE (618) for a very short period of time. When ABORT.SYNC has been set to 1 (620), PSRo is set to sPSR, which is the old value, thereby restoring the PSRo value to as the one in CLOCK1. It is noted that since FF1, FF2, and FF3 are all synchronized by the clock, with regard to PSRo, the time (622) between switching to nPSR (618) and further switching back to sPSR (620) is relatively small. As shown in the timing diagram, other than the quick switching time (622), the PSRo stays as the old value from CLOCK1 and CLOCK2.

The present invention as described above thus provides an improved system and method for handling state change conditions, especially for handling abort conditions. Various benefits are achieved over conventional approaches. For instance, the memory subsystem has more time to generate the appropriate abort condition response during its transactions. As a result, the processor may sample the abort condition at the end of the clock cycle.

The above disclosure provides many different embodiments, or examples, for implementing different features of the invention. Specific examples of components, and processes are described to help clarify the invention. These are, of course, merely examples and are not intended to limit the invention from that described in the claims.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A program status register comprising:
   a clock;
   at least one update value for updating the program status register to a second value from a first value when an update enable signal is received;
   a sampled program status register storing the first value of the program status register; and
   a state change sampling register generating a synchronized state change signal from a state change indication signal and the clock,
   wherein when the update enable signal is initially received and the state change indication signal is further received thereafter during a first clock cycle, an updated output of the program status register is restored through a first selection module to the first value upon generating the synchronized state change signal in a second clock cycle following the first clock cycle.

2. The program status register of claim 1 further comprising a second selection module selecting either the update value or the first value fed back from the output of the program status register to create a program status register input based on the update enable signal.

3. The program status register of claim 2 further comprising a synchronizing module for synchronizing the program status register input with the clock and generating a non-bypassed output of the program status register.

4. The program status register of claim 3 wherein the non-bypassed program status register output is connected to one or more predetermined connection points which do not require the restored first value in the second clock cycle.

5. The program status register of claim 1 wherein the state change indication signal is received towards the end of the first clock cycle meeting a requirement of a predetermined setup time of the state change sampling register.

6. The program status register of claim 1 wherein the synchronized state change signal lasts for a full clock cycle.

7. The program status register of claim 1 wherein the sampled program status register and the state change sampling register are multiplexors.

8. The program status register of claim 1 wherein the state change indication signal indicates that an abort condition has happened.

9. A program status register comprising:
   storing a first value of the program status register in a sampled program status register;
   detecting an update enable signal in a first clock cycle;
   updating the program status register to a second value;
   receiving a state change indication signal after detecting the update enable signal in the first clock cycle;
   generating a synchronized state change signal through a state change sampling register; and
   restoring an output of the program status register to the first value in a second clock cycle upon generating the synchronized state change signal.

10. The method of claim 9 wherein the second clock cycle follows the first clock cycle immediately.

11. The method of claim 9 wherein the state change indication signal is received within a predetermined time period before the end of the first clock cycle.

12. The method of claim 9 wherein the restoring further includes selecting either the second value or the stored first value by a multiplexor.

13. The method of claim 9 wherein the updating further includes creating a program status register input by selecting either the first value fed back from the output of the program status register or the second value upon receiving the update enable signal.

14. The method of claim 13 further includes synchronizing the program status register input with the clock and generating a non-bypassed output of the program status register.

15. The method of claim 14 wherein the restoring further includes selecting either the non-bypassed output or the stored first value to generate the output of the program status register.

16. A program status register comprising:
 a sampled program status register for storing a first output value of the program status register;
 an abort sampling register for generating a synchronized abort signal from an abort indication signal;
 a program status register input generating module, the module further comprising:
  an update enable input;
  at least one update input for updating the program status register to a second output value from a first output value when the update enable signal is received;
  a input selection module for selecting either the second output value or the first output value based on the update enable input, which is fed back from the output of the program status register, to generate an intermediate input for the program status register; and
 a synchronizing module synchronizing the intermediate input with a clock signal; and
 an output selection module for selecting either the synchronized intermediate input or the stored first output value to be the output value of the program status register based on the synchronized abort signal.

17. The program status register of claim 16 wherein the abort indication signal is received towards the end of a first clock cycle meeting a requirement of a predetermined setup time of the abort sampling register.

18. The program status register of claim 16 wherein the sampled program status register and the abort sampling register are multiplexors.

* * * * *